(12) United States Patent
Phillips et al.

(10) Patent No.: US 8,630,777 B2
(45) Date of Patent: Jan. 14, 2014

(54) SYSTEM AND METHOD FOR MODEL-BASED NEUTRAL IDLE CLUTCH CONTROL

(75) Inventors: Andrew W. Phillips, Rochester, MI (US); David W. Wright, Howell, MI (US); Ronald F. Lochocki, Jr., Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/102,152

(22) Filed: May 6, 2011

(65) Prior Publication Data

US 2012/0283922 A1    Nov. 8, 2012

(51) Int. Cl.
*F16H 59/00* (2006.01)
*F16H 57/08* (2006.01)

(52) U.S. Cl.
USPC ............ 701/66; 477/62; 701/67; 701/68

(58) Field of Classification Search
USPC ..................... 701/67, 68; 477/62
See application file for complete search history.

(56) References Cited

U.S. PATENT DOCUMENTS

| | | | | |
|---|---|---|---|---|
| 4,082,011 A | * | 4/1978 | McQuinn et al. | 477/30 |
| 4,735,113 A | * | 4/1988 | Yamamuro et al. | 477/38 |
| 4,896,565 A | * | 1/1990 | Simonyi et al. | 477/61 |
| 4,898,049 A | * | 2/1990 | Niikura | 477/114 |
| 4,922,424 A | * | 5/1990 | Hiramatsu | 701/53 |
| 4,938,097 A | * | 7/1990 | Pierce | 475/72 |
| 4,951,200 A | * | 8/1990 | Leising et al. | 701/58 |
| 5,179,875 A | * | 1/1993 | Brown | 477/154 |
| 5,188,005 A | * | 2/1993 | Sankpal et al. | 477/102 |
| 5,272,630 A | * | 12/1993 | Brown et al. | 701/68 |
| 5,389,046 A | * | 2/1995 | Timte et al. | 475/127 |
| 5,439,428 A | * | 8/1995 | Slicker | 477/175 |
| 5,468,196 A | * | 11/1995 | Minowa et al. | 477/62 |
| 5,612,874 A | * | 3/1997 | Schulz et al. | 701/51 |
| 5,627,750 A | * | 5/1997 | Kono et al. | 701/67 |
| 5,637,053 A | * | 6/1997 | Droste et al. | 477/62 |
| 5,749,061 A | * | 5/1998 | Kono et al. | 701/68 |
| 5,802,490 A | * | 9/1998 | Droste | 701/51 |
| 6,171,211 B1 | * | 1/2001 | Ortmann et al. | 477/62 |

(Continued)

OTHER PUBLICATIONS

Mir, New Intelligent Transmission Concept for Hybrid Mobile Robot Speed Control, pp. 259-263, International Journal of Advanced Robotic Systems, vol. 2, No. 3 (2005), ISSN 1729-8806.*

(Continued)

*Primary Examiner* — James Trammell
*Assistant Examiner* — Jean-Paul Cass
(74) *Attorney, Agent, or Firm* — Quinn Law Group, PLLC (57) ABSTRACT

A vehicle includes an engine, an automatic transmission, and a controller. The transmission includes a neutral idle (NI) state and a designated NI clutch which is selectively actuated to exit the NI state. The controller executes instructions from tangible memory to shift out of the NI state and into a drive state. The controller includes a slip model which generates a desired clutch slip profile as a differentiable time function, and a desired slip derivative of the desired slip profile. The desired profiles are used to calculate a clutch pressure command for controlling the designated NI clutch. The time function may be at least a third order/cubic equation. A method includes executing the slip model to generate the desired clutch slip profile, calculating a desired slip derivative of the desired slip profile, and using the desired slip profile derivative to calculate a clutch pressure command for the designated NI clutch.

13 Claims, 4 Drawing Sheets

(56) References Cited

U.S. PATENT DOCUMENTS

| | | | |
|---|---|---|---|
| 6,231,479 B1* | 5/2001 | Kraska et al. | 477/143 |
| 6,275,761 B1* | 8/2001 | Ting | 701/59 |
| 6,308,125 B1* | 10/2001 | Gleason et al. | 701/67 |
| 6,480,777 B1* | 11/2002 | Sato et al. | 701/60 |
| 6,554,739 B2* | 4/2003 | Saito et al. | 477/115 |
| 6,554,742 B2* | 4/2003 | Milender et al. | 477/155 |
| 6,873,894 B2* | 3/2005 | Bansbach et al. | 701/67 |
| 7,021,409 B2* | 4/2006 | Tamor | 180/65.25 |
| 7,247,125 B2* | 7/2007 | Scelers | 477/127 |
| 7,620,487 B2* | 11/2009 | Shimada et al. | 701/60 |
| 7,752,021 B2* | 7/2010 | Holtz et al. | 703/6 |
| 7,753,150 B2* | 7/2010 | Tamor | 180/65.265 |
| 8,079,933 B2* | 12/2011 | Kaminsky et al. | 477/5 |
| 2005/0256625 A1* | 11/2005 | Sah et al. | 701/67 |
| 2005/0256626 A1* | 11/2005 | Hsieh et al. | 701/67 |
| 2008/0227597 A1* | 9/2008 | Povirk et al. | 477/62 |
| 2009/0325757 A1* | 12/2009 | Dromard et al. | 477/62 |
| 2010/0170740 A1* | 7/2010 | Lochocki et al. | 180/338 |
| 2010/0228412 A1* | 9/2010 | Sah | 701/22 |
| 2010/0273606 A1* | 10/2010 | Roses et al. | 477/62 |
| 2010/0304928 A1 | 12/2010 | Lochocki, Jr. et al. | |
| 2011/0071741 A1 | 3/2011 | Lochocki, Jr. et al. | |
| 2011/0077830 A1 | 3/2011 | Lochocki, Jr. et al. | |

OTHER PUBLICATIONS

Weissler, Paul, Automotive Design, Ford's new dual clutch, www.automotivedesign.eu.com/article/27775/Fords-new-dual-clutch-transmission-benefits-from-human-factors-engineering-virtual-sensing.aspx dated May 27, 2010.*

* cited by examiner

SYSTEM AND METHOD FOR MODEL-BASED NEUTRAL IDLE CLUTCH CONTROL

TECHNICAL FIELD

The present disclosure relates to the shift control of an automatic vehicle transmission having a hydraulic neutral or neutral idle state.

BACKGROUND

A vehicle transmission transmits mechanical engine torque to a set of drive wheels in order to propel the vehicle through a range of output speeds. In an automatic transmission, a hydrodynamic torque converter automatically and variably couples an engine output shaft to a transmission input shaft while multiplying engine torque at lower vehicle speeds. As vehicle speed decreases, an increasing amount of slip occurs between an impeller or pump and a turbine of the torque converter, with a maximum slip level reached at zero vehicle speed.

This variable slip capability allows the engine to continue to rotate when the vehicle is idling in certain transmission states or modes, for instance in park, neutral, or in a forward or reverse drive state. In some transmission designs operating in a state similar to neutral during a drive detent position, for instance when the vehicle reaches zero output speed, when coasting down toward zero speed, upon a garage shift from park or neutral to drive, or when at standstill/idling, the transmission may automatically shift into a hydraulic neutral state. In such a state, electro-hydraulic controls regulate turbine speed relative to engine speed to reduce fuel consumption and minimize noise, vibration, and harshness. This hydraulic neutral state is referred to as neutral idle.

SUMMARY

A vehicle includes a transmission having a designated neutral idle (NI) clutch and a controller configured for actuating the designated NI clutch during a predetermined shift event out of an NI state and into a drive state. The controller may include a host machine having tangible, non-transitory memory on which is recorded instructions for executing a model-based shift method as set forth herein. The instructions are executable by the host machine to control and re-engage the designated NI clutch when exiting the NI state. The present model-based approach may be used to improve shift smoothness/feel when exiting the NI state by controlling the amount of slip across the designated NI clutch according to a modeled desired slip profile and its time derivative rather than via complex and highly calibration-specific lookup tables.

In particular, the present slip model generates the desired slip profile as a differentiable time function. The slip profile approaches zero at a rate, i.e., its derivative, which simultaneously approaches zero. The differentiable time function may be, by way of a non-limiting example, a third order/cubic equation, a higher-order equation, a sine or cosine function, or any other sufficiently differentiable time function.

A calibrated inertia value may be determined a priori using the known inertia of the torque converter turbine, the transmission input shaft, and any rotatable elements connected or otherwise reflected forward to the turbine. An acceleration torque value may be calculated from the inertia value and the modeled desired slip profile/slip derivative profile, with the acceleration torque value representing the torque needed to create a required rate of change in clutch slip to achieve the desired profiles.

The acceleration torque value and a turbine torque provided from a torque converter model are combined to determine a clutch torque command for actuation of the designated NI clutch. This clutch torque command may be converted to a required pressure command and further optimized using one or both of dithering block and a lead filter data processing block as explained in detail herein. The optimized clutch pressure command is ultimately transmitted to the designated NI clutch, and the shift event is completed according to this optimized pressure command.

The above features and advantages and other features and advantages of the present invention are readily apparent from the following detailed description of the best modes for carrying out the invention when taken in connection with the accompanying drawings.

DESCRIPTION

Figure 1:
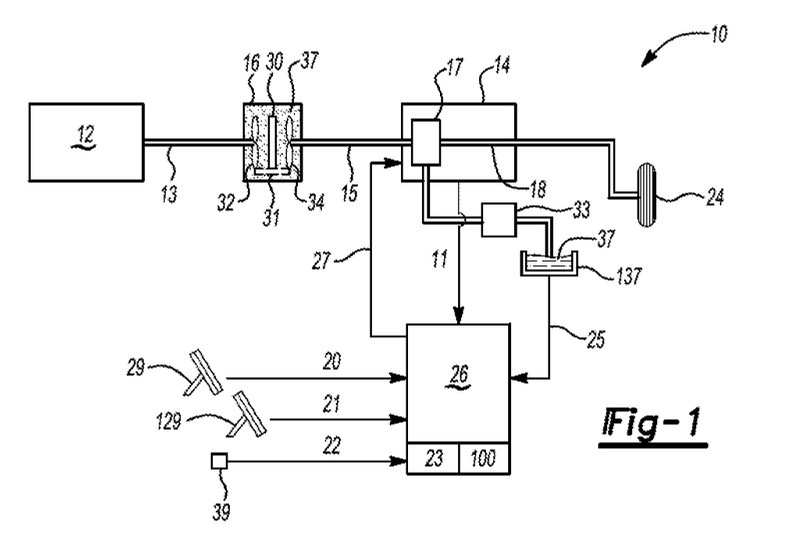
FIG. 1 is a schematic illustration of an example vehicle having an automatic transmission and a controller configured to exit a neutral idle (NI)/hydraulic neutral state according to a shift control method as set forth herein.

Referring to the drawings, wherein like reference numbers correspond to like or similar components throughout the several figures, and beginning with FIG. 1, a vehicle 10 includes an internal combustion engine 12, an automatic transmission 14, and a shift controller 26. The controller 26 is configured to execute a hydraulic neutral/neutral idle (NI) shift control method 100 to allow the transmission 14 to smoothly exit the NI state and thereafter enter a forward or reverse drive state.

As explained in detail below, the controller 26 uses a calibrated clutch slip model 23 to generate a desired clutch slip profile as a differentiable time function using, by way of example, at least a third order/cubic equation, and ultimately uses this differentiable slip profile and a calculated derivative of this slip profile to generate a clutch pressure command (arrow 27). The clutch pressure command (arrow 27) is then transmitted to a designated NI clutch of the transmission 14. Possible designated NI clutches are discussed below with reference to FIGS. 3, 4, and 5.

The engine 12 includes an output shaft 13 which is coupled to an input shaft 15 of transmission 14 via a hydrodynamic torque converter 16 of the type known in the art. Transfer of engine torque to the transmission 14, as well as any necessary torque multiplication, thus occurs at a variable rate through the torque converter 16 as a function of changing engine speed. The torque converter 16 includes a stator 30, an impeller or pump 32, and a turbine 34. An optional lockup clutch 31 may be used to selectively lock the pump 32 and turbine 34 above a threshold lockup speed. The pump 32 may be bolted or otherwise directly connected to the output shaft 13 so as to rotate at engine speed. The turbine 34 is driven by oil 37 and connected to the input shaft 15 of the transmission 14. In this manner, the input shaft 15 is allowed to rotate at turbine speed. Viscous drag or friction losses occurring within the transmission 14 may reduce turbine speed to a level that is slightly less than engine speed.

The transmission 14 also includes an output shaft 18 connected to a set of drive wheels 24. The output shaft 18 ultimately transmits a transmission output torque from various elements 17 of the transmission 14, e.g., rotating or braking clutches, planetary gear elements such as sun, ring, and planetary carrier members, to the drive wheels 24. In one embodiment, the elements 17 may be selectively actuated using electro-hydraulic controls powered by fluid 37 drawn from a sump 137 and circulated via a transmission pump 33.

The transmission 14 may be configured as a multi-speed transmission, for instance a 6-speed or higher speed transmission. Initially, the transmission 14 may operate in a forward or a reverse drive state while electro-hydraulic clutch pressure regulation valves (not shown) reduce the fluid pressure acting on the designated NI clutch, thereby placing the transmission 14 into a partially-loaded hydraulic neutral/NI state. Data elements (arrow 11) used by the controller 26 in executing the method 100 may be sampled or processed during other transmission states such as neutral and park. Execution of the present method 100 thus allows the transmission 14 to smoothly exit the NI state.

Example vehicle data elements (arrow 11) for determining appropriate NI state exit conditions may include, but are not necessarily limited to: vehicle output speed (arrow 22), a value which may be measured by one or more sensors 39 shown separately in FIG. 1 for clarity, but which could also be positioned as needed within the vehicle 10, e.g., at or along the output shaft 18 and/or at the drive wheels 24, etc; a throttle level (arrow 21) of a throttle input device such as an accelerator pedal 129; a braking level (arrow 20) such as pedal position/travel and/or a braking force applied to a brake pedal 29; a PRNDL setting of the transmission 14, which may be known from shift logic or detected via a position of a shift lever (not shown); a fluid temperature (arrow 25) of the fluid 37 contained in the sump 137; onboard diagnostics; or any other suitable data elements.

Still referring to FIG. 1, the controller 26 may be configured as a host machine microprocessor-based device having a tangible, non-transitory memory device 99 on which is recorded instructions encoding the method 100. The host machine may include such common elements as a microprocessor or a central processing unit (CPU), additional memory including but not limited to: read only memory (ROM), random access memory (RAM), electrically-erasable programmable read-only memory (EEPROM), etc., and circuitry including but not limited to: a high-speed clock (not shown), analog-to-digital (A/D) circuitry, digital-to-analog (D/A) circuitry, a digital signal processor, and any necessary input/output (I/O) devices and other signal conditioning and/or buffer circuitry. However configured, the controller 26 executes method 100 from memory 99, with an example of method 100 shown in FIG. 8 and explained below.

Figure 2:
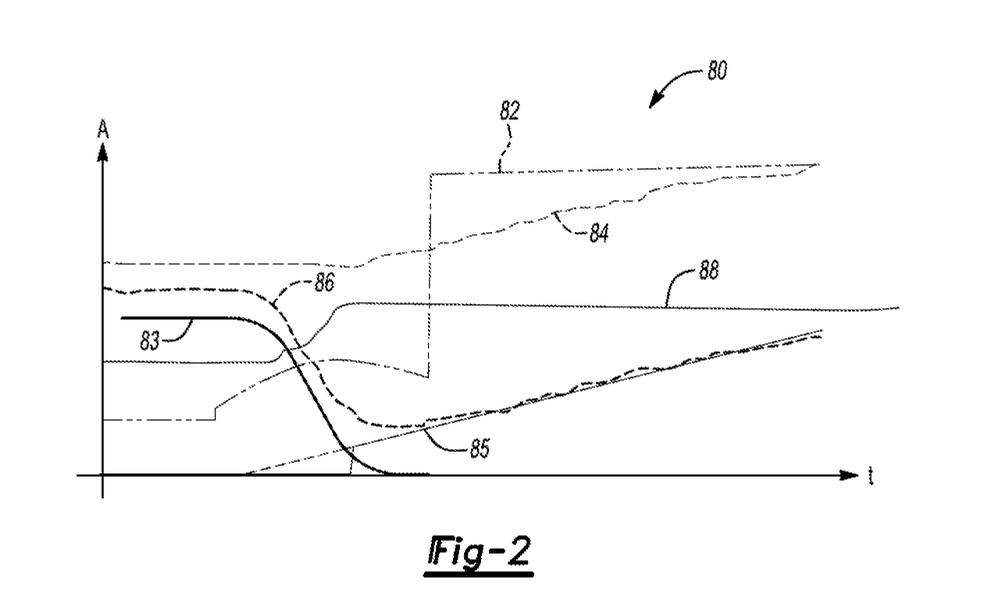
FIG. 2 is a time plot of a set of performance values for the example vehicle shown in FIG. 1.

Referring to FIG. 2, it is recognized herein that the conventional mathematical programming of a lookup table with extractable values in the control of an "ideal" clutch shift may be less than optimal in actual practice. Various factors directly or indirectly influence a given shift event, including clutch slip speed, turbine speed, and engine speed, with each of these factors in turn influenced by various driveline and environmental factors. Calibrated values recorded in a lookup table may fail to correspond over time to the actual required performance of the transmission 14. For an ideal launch, for example, engine torque must rise in a smooth and steadily increasing manner. At the same time, pressure control to the various transmission clutches cannot be overwhelmed. Steady-state turbine torque, difficult to quantity oil inertia effects, and seal friction within a given designated clutch can largely prevent small pressure reductions to occur in a clutch fill pressure command.

In the time plot 80 of FIG. 2, time (t) is represented via the horizontal axis and signal amplitude (A) is represented via the vertical axis to collectively describe an illustrative application of a designated NI clutch with clutch pressure regulated at a return spring pressure. A clutch pack (not shown) of the designated NI clutch is first compressed, and a regulation system thereafter controls the designated NI clutch to a predetermined level of slip to unload the engine, e.g., the engine 12 of FIG. 1. When clutch re-apply is initiated upon exiting the NI state, a clutch pressure command (trace 82) is stepped to effectively compress a wave plate or other suitably resilient clutch return device. Turbine speed (trace 86) is pulled down as the input shaft 15 shown in FIG. 1 accelerates (trace 88).

Simultaneously, a pressure rise occurs in commanded clutch pressure (trace 82). Turbine speed (trace 86) decreases toward a calibrated command line (trace 85), which is at a level in which turbine speed (trace 86) would reside absent NI state functionality. Turbine speed (trace 86) must meet trace 85 asymptomatically or the driveline of the vehicle 10 of FIG. 1 will ring or resonate. When turbine speed (trace 86) and the calibrated command line (trace 85) are close to each other, the controller 26 of FIG. 1 determines that the NI shift event is complete. Thereafter, the controller 26 sends the clutch pressure command (trace 82) to a calibrated line pressure, thereby locking the designated NI clutch.

Clutch slip (trace 83) across the designated NI clutch is determined by the controller 26 using the slip model 23 of FIG. 1, as explained in detail below with reference to FIGS. 6-8, in order to ensure a smooth, "ringless" dovetailing of the decreasing turbine speed (trace 86) and the increasing command line (trace 85), which rises in conjunction with increasing engine speed (trace 84).

Figure 3:
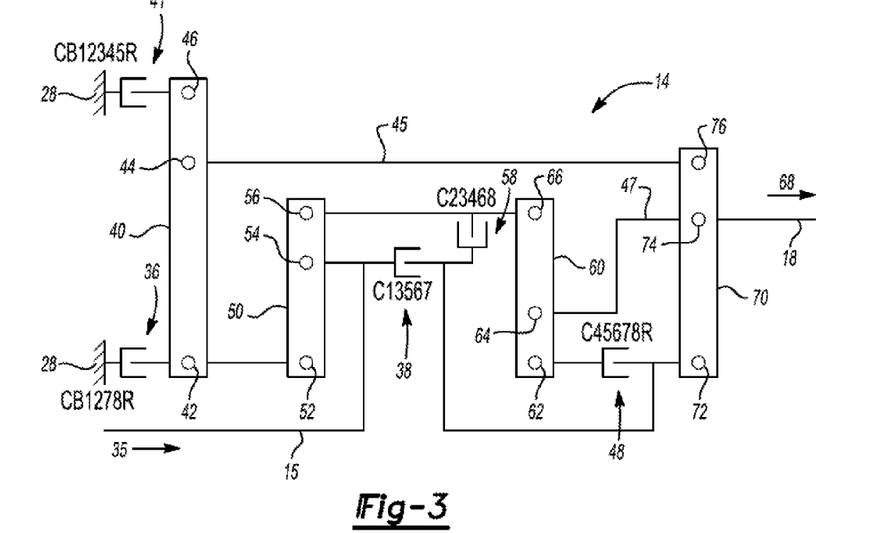
FIG. 3 is a lever diagram describing an example rear-wheel drive, 8-speed automatic transmission usable with the example vehicle shown in FIG. 1.
Figure 4:
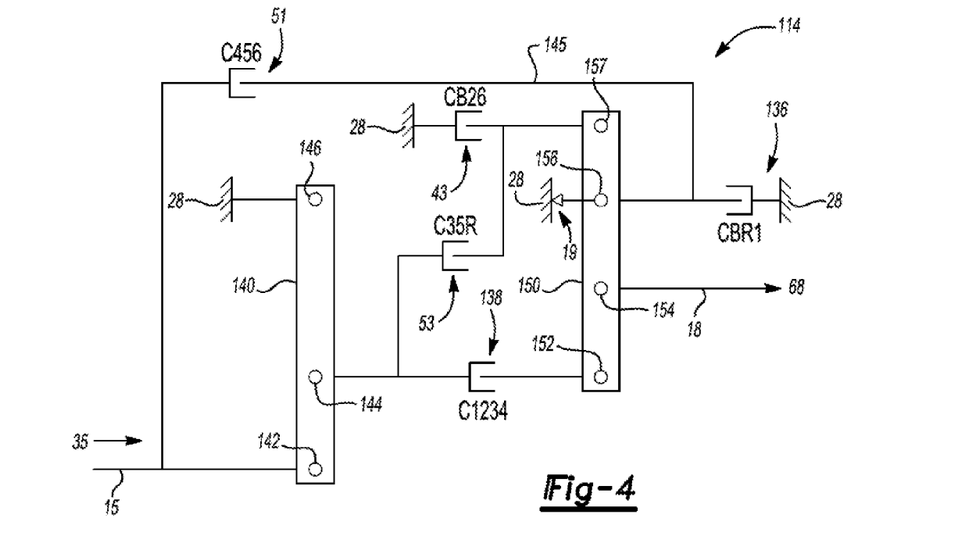
FIG. 4 is a lever diagram describing an example rear-wheel drive, 6-speed automatic transmission usable with the example vehicle shown in FIG. 1.
Figure 5:
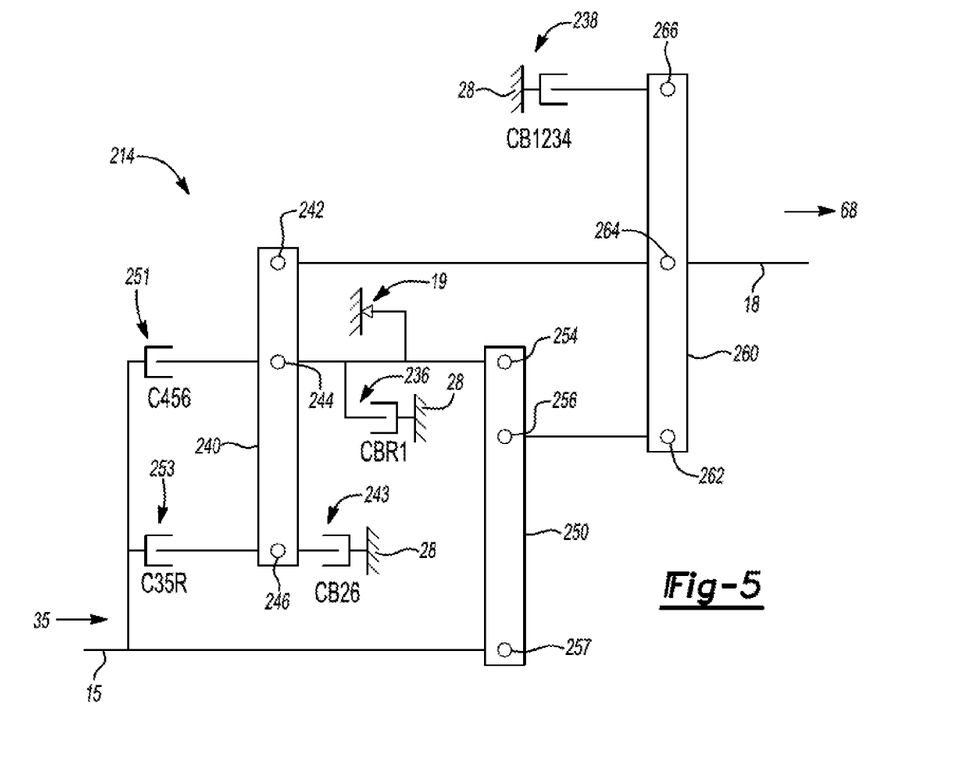
FIG. 5 is a lever diagram describing an example front-wheel drive, 6-speed automatic transmission usable with the example vehicle shown in FIG. 1.

Referring to FIGS. 3-5, the transmission 14 of FIG. 1 may be embodied in various ways. Example transmissions are shown in lever diagram form in these three Figures, with an 8-speed variant shown in FIG. 3, and with respective rear-wheel and front-wheel drive 6-speed variants shown in FIGS. 4 and 5. Discussion of the present control method 100 resumes with FIG. 6 below after an overview of three example transmissions.

Referring first to FIG. 3, the transmission 14 may be embodied as an 8-speed rear wheel drive transmission as shown. The designated NI clutch in this configuration may vary with the design, and may include clutch 36, clutch 38, or clutch 41. The transmission 14 shown in FIG. 3 may include first, second, third, and fourth planetary gear sets 40, 50, 60, and 70. Gear set 40 includes respective first, second, and third nodes 42, 44, and 46, which in one embodiment may be a respective sun gear, planetary carrier, and ring gear. Gear set 50 may also include three nodes, i.e., nodes 52, 54, and 56, which in one embodiment may likewise be a sun gear, a planetary carrier, and a ring gear.

Gear set 60 may include nodes 62, 64, and 66, which may be configured as a ring gear, planetary carrier, and sun gear, respectively. Gear set 70 may include nodes 72, 74, and 76, which may be configured as a sun gear, planetary carrier, and ring gear in one possible embodiment. Node 76 of gear set 70 may be directly connected to node 44 of gear set 40 via an interconnecting member 45 as shown.

The transmission 14 of FIG. 3 further includes braking clutches clutch 36 (CB1278R) and 41 (CB12345R), as well as rotating clutches 38 (C13567), 48 (C45678R), and 58 (C23468). As used herein, the nomenclature C denotes a clutch, B denotes braking, i.e., a clutch connected on one end to a stationary member 28, 1-8 denotes $1^{st}$-$8^{th}$ gear, respectively, and R denotes reverse. Inclusion of a particular gear in the nomenclature thus indicates that the particular clutch is engaged during that particular gear state.

Clutch 41 selectively connects an element of the first gear set 40 to the stationary member 28. Clutch 36 is likewise connected to the stationary member 28 and to node 42 of the first gear set 40. Node 42 is directly connected to node 52 of the second gear set 50. Node 54 of the second gear set 50 is connected to an input side of clutch 38, as is the transmission input shaft 15 with its input torque (arrow 35). Node 56 of the second gear set 50 is connected to node 66 of the third gear set 60 via clutch 58. Node 62 may be connected to the fourth gear set 70 via clutch 48. Node 64 of gear set 60 may be directly connected to node 74 of the fourth gear set 70 via an interconnecting member 47, with the same node 74 in turn connected to the transmission output shaft 18. Transmission output torque (arrow 68) is ultimately transmitted to the drive wheels 24 of FIG. 1.

Referring to FIG. 4, the transmission 14 of FIGS. 1 and 3 may also be embodied as a 6-speed rear-wheel drive configuration, as represented by transmission 114. The designated NI clutch in this particular embodiment may be clutch 138 or, optionally, clutch 53 between node 144 and node 157 of a second gear set 150. The transmission input shaft 15 may be connected to a first gear set 140 having nodes 142, 144, and 146, which may be embodied as a ring gear, a planetary carrier, and sun gear, respectively, in one possible embodiment. The input shaft 15 may be directly connected to node 142 to deliver the input torque (arrow 35) to node 142, and to a clutch 51 (C456). Node 144 is connected to a clutch 138 (C1234) and to an input side of a rotating clutch 53 (C35R). Node 146 is selectively grounded to the stationary member 28 as shown.

A second gear set 150 includes nodes 152, 154, 156, and 157, which may be used as a sun gear, ring gear, carrier member, and another sun gear, respectively, in one example embodiment. Node 154 is directly connected to the transmission output shaft 18 to transmit the output torque (arrow 68) to the drive wheels 24 of FIG. 1. Node 156 is connected to a braking clutch 136 (CBR1), which is also connected to stationary member 28. Node 157 is connected to the output side of a clutch 43 (CB26), which is connected on the opposite side to stationary member 28 as shown. A clutch 51 (C456) transmits input torque (arrow 35) from the input shaft 15 to the input side of clutch 136 via an interconnecting member 145 as shown. A freewheeling element 19 such as an overrunning clutch or passive one-way clutch may be connected between the stationary member 28 and node 156 to allow rotation with respect to node 156 in only one rotational direction.

Referring to FIG. 5, the transmission 14 of FIGS. 1 and 3 is shown as a transmission 214 configured as an example 6-speed front-wheel drive transmission. Transmission 214 may include first, second, and third gear sets 240, 250, and 260, respectively; braking clutches 243 (CB26), 236 (CBR1), and 238 (CB1234), and rotating clutches 253 (C35R) and 251 (C456). In this embodiment, the designated NI clutch may be clutch 238 or, optionally, clutch 253. As with the embodiment of FIG. 4, a free-wheeling element 19 is used to prevent rotation with respect to a node 254 of the second gear set 250.

The first gear set 240 may include nodes 242, 244, and 246, which in one possible embodiment may be a ring gear, a carrier member, and a sun gear, respectively. The input shaft 15 may be selectively connected to nodes 244 and 246 via clutches 251 and 253, respectively. Node 242 is directly connected to node 264 of the third gear set 260.

The second gear set 250 includes nodes 254, 256, and 257, which in one possible embodiment may be configured as a ring gear, a carrier member, and a sun gear, respectively. Node 257 is directly connected to the transmission input shaft 15. Node 254 is connected to node 244 of the first gear set 240. Free-wheeling element 19 connects to the stationary member 28 to allow rotation with respect to node 254 in only one rotational direction.

The third gear set 260 includes nodes 262, 264, and 266, which may be embodied as a ring gear, a carrier gear, and a sun gear, respectively. Node 266 is selectively connected to stationary member 28 via a clutch 238 (CB1234). Node 264 is connected to node 242 of the first gear set 240, and to the output shaft 18 of transmission 14. Node 262 is directly connected to node 256 of the second gear set 250.

Figure 6:
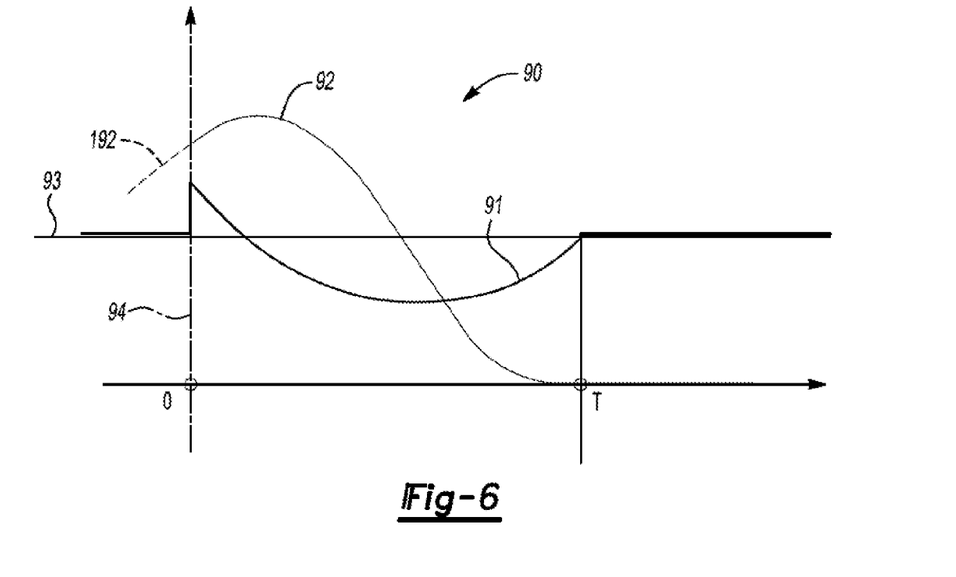
FIG. 6 is a time plot of a modeled slip profile and its derivative slip profile using an example third order/cubic function.

Referring to FIG. 6, a time plot 90 is shown with a desired clutch slip profile (trace 92) and a desired slip derivative (trace 91). Trace 91 is the time derivative of trace 92. Trace 92 is automatically generated via the slip model 23 shown in FIG. 1. In the time plot 90, the horizontal axis represents time (t), and the duration of control extends from the point of initiation of a shift out of NI (point 0) to the completion of the shift event (point T). Prior to point 0, trace 192 represents the actual slip across the designated NI clutch. Axis 94 is the clutch slip axis, and axis 93 is the acceleration (w) axis.

Before the controller 26 of FIG. 1 generates the desired slip profile (trace 92) via the slip model 23, actual slip across the designated clutch (trace 192) is measured and/or calculated by the controller 26, or by a separate device and communication to the controller 26. When the transmission 14 or any of its variants is to be shifted out of the NI state commencing at time point 0, the controller 26 automatically generates the differentiable time function to produce trace 92.

At each calibrated time step the controller 26 calculates trace 91 as explained below with respect to FIG. 8. The differentiable time function must approach zero at a rate (represented by the derivative, or trace 91) which also simultaneously approaches zero as shown in FIG. 6. A zero final derivative at time point T helps to ensure that lockup/bump or ringing of the driveline does not occur. The differentiable time function used to produce the desired shift profile (trace 92) in the example embodiment of FIG. 6 is a third order/cubic equation. Other approaches may be used depending on the application, including but not limited to a fourth order or higher equation, a sine/cosine function, or any other sufficiently differentiable time function.

Keeping with the example of a cubic, i.e., a function having four degrees of freedom, initial clutch slip conditions may be represented mathematically as the coefficients B0 and B1, with B0 representing the initial clutch slip and B1 representing the initial clutch slip derivative. If B0<0, then B0 may be set equal to −B0 and B1 may be set to −B1, as torque must act to reduce slip. If (B0+(B1)(T))<0, then T may be set to −(B0/B1) to provide optimal smoothing. The other two coefficients, i.e., B2 and B3, may be calculated by the controller 26 as follows:

$$B2 = \frac{-(3*B0 + 2*B1*T)}{T^2}$$

$$B3 = \frac{(2*B0 + B1*T)}{T^3}$$

The desired clutch slip may be calculated at each calibrated time step after shift initiation as follows:

desired clutch slip (trace 92)=$B0$+ET($B1$+ET($B2$+ ET*$B3$))

desired clutch slip derivative profile (trace 91)=$B1$+ET (2*$B2$+ET*3*$B3$)

where ET represents the elapsed time since initiation of the present shift event.

Figure 7:
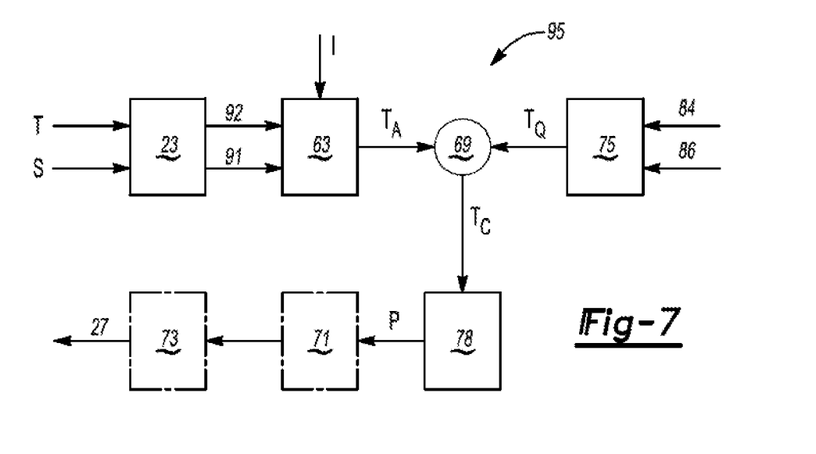
FIG. 7 is a schematic logic block diagram for a controller usable with the example vehicle shown in FIG. 1.

Referring to FIG. 7, a logic flow diagram 95 describes the general flow of information through the controller 26 of FIG. 1. The controller 26 may include the slip model 23 noted above, an acceleration torque block 63, and a torque converter model 75. The slip model 23 uses as one input the calibrated shift duration T shown in FIG. 6, i.e., the interval of time between initiation of a shift event of a designated NI clutch and completion of that shift event. Other inputs include the initial slip (coefficient B0) and the initial slip derivative (coefficient B1), whether measured or calculated. Thus, inputs T, B0, and B1 are fed into the slip model 23.

The slip model 23 generates a desired slip profile (arrow 92) and calculates its derivative (arrow 91). Also see FIG. 6. The desired slip profile (arrow 92) and its derivative (arrow 91) are fed into the acceleration torque block 63 along with a calibrated inertia value (I). The calibrated inertia value (I) quantifies, as closely as possible, the inertia of the turbine 34 shown in FIG. 1 and any rotating transmission and driveline elements reflected to the turbine 34, e.g., gear elements, shafts, etc. The acceleration torque block 63 outputs an acceleration torque ($T_A$) to a computational node 69, with the acceleration torque representing the torque due to acceleration needed to produce the desired rate of change in slip, i.e., the derivative of arrow 91.

Node 69 also receives a turbine torque ($T_Q$) from the torque converter model 75, i.e., a model of the physics of the various components of the torque converter 16 shown in FIG. 1. Such a model may use engine speed (arrow 84) and turbine speed (arrow 86), which are represented in FIG. 2 as traces 84 and 86. The turbine torque ($T_Q$) is essentially the torque provided by the torque converter which effectively opposes clutch rotation. The torque values $T_A$ and $T_Q$ are combined at node 69 to calculate an initial torque command ($T_C$). This value may be fed into a pressure conversion block 78, from which is calculated, extracted from a lookup table, or otherwise determined an initial clutch pressure command (P).

Due to the inherent physical limitations and variability of any fluidic system, e.g., seal set, hysteresis, return spring physics, etc., the clutch pressure command (P) may be less than optimal. Further optimization may be achieved by accommodating such limitations using one or both of an optional lead filter block 71 and a dithering block 73. Lead filter block 71 may provide lead compensation to reduce any underirable system response, as understood in the art. The dithering block 73 may impose a suitable dither signal, e.g., a periodic square wave, on the clutch pressure command to help prevent seal set and decrease clutch hysteresis. The final clutch pressure command (arrow 27) from block 73 is then fed to the designated NI clutch.

Figure 8:
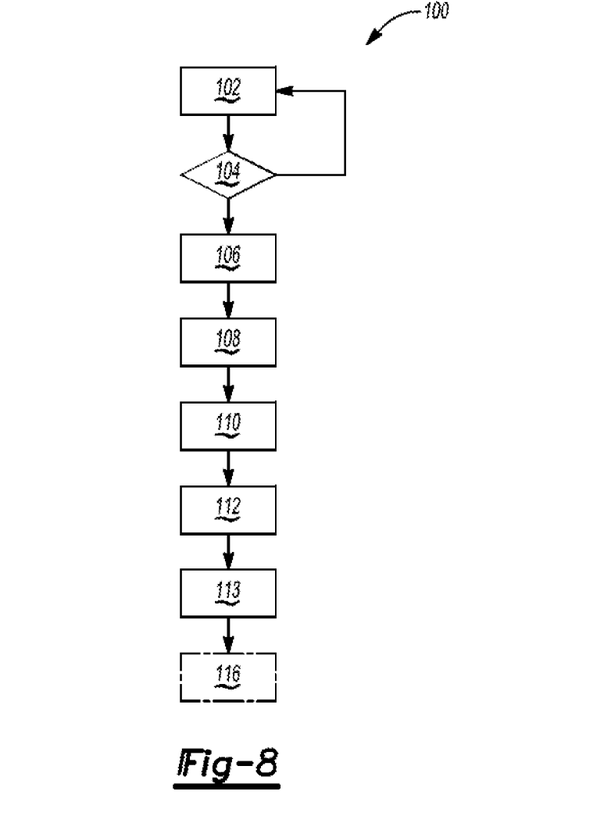
FIG. 8 is a graphical flow chart describing an example method for executing the present shift control method.

Referring to FIG. 8 in conjunction with FIGS. 1 and 7, an example embodiment of the present method 100 begins with step 102, wherein the controller 26 of FIG. 1 receives a set of inputs from the driver of the vehicle 10, for instance a position/force of the brake pedal 29 as represented by arrow 20. Additional information may be received from various vehicle components, e.g., the engine 12, the transmission 14, the torque converter 16, etc.

At step 104, the controller 26 determines whether the information collected at step 102 corresponds to initiation of an NI shift event, i.e., a transition from NI to a drive state. If conditions indicate initiation of such a shift event, the controller 26 proceeds to step 106, and otherwise repeats step 102.

At step 106, the controller 26 of FIG. 1 processes the duration (T) and initial slip conditions, which may be quantified as the coefficients B0 and B1 as explained above. Step 106 may entail generating the desired slip profile 92 and its derivative 91. Once the traces of FIG. 6 are generated via the slip model 23 of FIG. 1, the controller 26 proceeds to step 108.

At step 108, the inertia value (I) is processed by the acceleration torque block 63 of FIG. 7 along with the output values from step 106, i.e., desired slip profile 92 and the desired slip profile 91. Step 108 may entail calculating the acceleration torque value ($T_A$) as noted above. Once the acceleration torque value ($T_A$) is determined, this value is fed into computational node 69. The controller 26 proceeds to step 110.

At step 110, the torque converter model 75 calculates the turbine torque ($T_Q$), e.g., as a function of engine speed (arrow 84) and turbine speed (arrow 86). This value is fed into the computational node 69. The controller 26 proceeds to step 112.

At step 112, the controller 26 calculates the torque command ($T_C$) from the acceleration torque value ($T_A$) and turbine torque ($T_Q$). This value is fed into the pressure calculation block 78. The controller 26 proceeds to step 113.

At step 113, clutch pressure (P) is calculated or otherwise determined from the torque command ($T_C$). This value may be transmitted to the designated NI clutch, and the method 100 may end at this point. Optionally, the method 100 may proceed to step 116 to further optimize the pressure signal.

At optional step 116, the clutch pressure may be processed through either/both of the lead filter block 71 and dithering block 73 of FIG. 7, e.g., in order to compensate for hysteresis and prevent seal set in the designated NI clutch. This optimized final clutch pressure command (arrow 27) may then be transmitted to the designated NI clutch.

Additional calibration handles may be used at step 116, as well as in any of the forgoing steps, to tune performance to actual conditions. That is, the performance of a mechanical system may be difficult to model or calculate for use in calibration, with actual conditions affecting the performance over time. Calibration handles in the form of, for instance, selectable or variable parameters for inertia value (I), duration (T), or other values could be used to optimize overall performance. Therefore, the disclosed approach allows for model-based clutch control, with can be optimized using experimentally-tuned parameters.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an engine;
   a torque converter having a turbine;
   an automatic transmission having an input shaft connected to the turbine which receives input torque from the engine, and which includes a neutral idle (NI) state providing a hydraulic neutral state when the transmission is in a drive detent position, and which also includes a designated NI clutch which is configured to be selectively slipped in the NI state; and a controller operable to execute an NI shift event of the transmission to shift the transmission out of the NI state and into a drive state;

wherein the controller includes a slip model describing slip across the designated NI clutch and is configured to:

determine a calibrated time (T) to complete the NI shift event;

generate a calibrated clutch slip profile for the designated NI clutch as a differentiable time function during the NI shift event, wherein the differentiable time function is at least a third order or cubic equation which approaches zero and ultimately reaches zero not before the calibrated time (T);

calculate a slip derivative of the calibrated slip profile;

calculate an initial torque command as a function of the calibrated slip profile, the calculated slip derivative, a calibrated inertia value quantifying the inertia of at least the turbine, and a turbine torque of the turbine;

convert the initial torque command into a clutch pressure command; and control the designated NI clutch during the NI shift event using the clutch pressure command to thereby control an amount of slip across the designated NI clutch through the calibrated time (T) of the NI shift event according to the calibrated shift profile.

2. The vehicle of claim 1, further comprising a torque converter model, wherein the controller determines the turbine torque using the torque converter model.

3. The vehicle of claim 1, wherein the controller is configured to process the clutch pressure command through at least one of a dithering block and a lead filter, and to transmit the processed clutch pressure command to the designated NI clutch.

4. The vehicle of claim 1, further comprising a stationary member, wherein the transmission includes a plurality of planetary gear sets, and wherein the designated NI clutch is one of:

a braking clutch which selectively grounds a member of one gear set of the plurality of gear sets to the stationary member; and a rotating clutch which selectively connects different members of the planetary gear sets to each other.

5. The vehicle of claim 4, wherein the transmission is an 8-speed transmission having four planetary gear sets, and wherein the designated NI clutch is the braking clutch.

6. A controller comprising:

a host machine having a tangible, non-transitory memory device, wherein the host machine is in communication with a vehicle having a torque converter with a turbine connected to an input shaft of a transmission, wherein the transmission has a neutral idle (NI) state entered while the transmission is in a drive detent position and a designated NI clutch applied for exiting the NI state during a predetermined NI shift event; and a set of instructions recorded on the memory device;

wherein the host machine is configured for executing the instructions from the memory device to actuate the designated NI clutch during the NI shift event, including:

determining a calibrated time (T) to complete the NI shift event;

executing a slip model which generates a calibrated clutch slip profile of the designated NI clutch as a differentiable time function that approaches zero and ultimately reaches zero not before the calibrated time (T), wherein the calibrated clutch slip profile is at least a third order or cubic equation;

calculating a slip derivative of the calibrated slip profile;

calculating an initial torque command for the designated NI clutch as a function of the calibrated slip profile, the calculated slip derivative, a calibrated inertia value quantifying the inertia of the turbine, and a turbine torque of the turbine;

converting the initial torque command to a clutch pressure command; and controlling the designated NI clutch, via the host machine, using the clutch pressure command during the NI shift event to thereby control an amount of slip across the designated NI clutch through the calibrated time (T) of the NI shift event according to the calibrated shift profile.

7. The controller of claim 6, wherein the host machine includes a torque converter model that provides the turbine torque.

8. The controller of claim 6, wherein the instructions include an acceleration torque block which calculates an acceleration torque value for the transmission input shaft as a function of each of the calibrated slip profile, the calculated slip derivative, and the calibrated inertia value, and wherein the controller is configured to calculate the clutch pressure command as a function of the acceleration torque value.

9. The controller of claim 6, wherein the host machine is configured to process the clutch pressure command through at least one of a dithering block and a lead filter prior to transmitting the pressure command to the designated NI clutch.

10. A method comprising:

determining a calibrated time (T) to complete a predetermined neutral idle (NI) shift event out of an NI state in a vehicle, wherein the NI state is a hydraulic neutral state of a vehicle transmission entered when the transmission is in a drive detent position;

executing a slip model via a controller to thereby generate a calibrated clutch slip profile of a designated NI clutch of the transmission as a differentiable time function during the predetermined NI shift event, wherein the differentiable time function is at least a third order or cubic equation which reaches zero not before the calibrated time (T);

calculating a slip derivative of the calibrated slip profile, wherein the calculated slip derivative reaches zero at the calibrated time (T);

calculating a clutch pressure command for the designated NI clutch of the transmission as a function of the calibrated slip profile, a turbine torque of the turbine; and the calculated slip derivative; and controlling the designated NI clutch during the predetermined NI shift event, via the controller, using the calculated clutch pressure command to thereby exit the NI state to thereby control an amount of slip across the designated NI clutch through the calibrated time (T) of the NI shift event according to the calibrated shift profile.

11. The method of claim 10, further comprising:

determining the turbine torque of the torque converter of the vehicle via a torque converter model; and calculating the clutch pressure command via the controller.

12. The method of claim 10, further comprising:
calculating an acceleration torque value for an input shaft of the transmission using the calibrated slip profile, the calculated slip derivative, and the calibrated inertia value; and
calculating the clutch pressure command as a function of the acceleration torque value.

13. The method of claim 10, further comprising:
processing the clutch pressure command through at least one of a dithering block and a lead filter prior to transmitting the pressure command to the designated NI clutch.

\* \* \* \* \*